US009608985B2

(12) United States Patent
Park

(10) Patent No.: US 9,608,985 B2
(45) Date of Patent: Mar. 28, 2017

(54) IMAGE FORMING APPARATUS SUPPORTING PEER-TO-PEER CONNECTION AND METHOD OF CONTROLLING JOB AUTHORITY THEREOF

(75) Inventor: Seong-il Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 13/599,334

(22) Filed: Aug. 30, 2012

(65) Prior Publication Data

US 2013/0057913 A1 Mar. 7, 2013

(30) Foreign Application Priority Data

Sep. 2, 2011 (KR) .................. 10-2011-0089252

(51) Int. Cl.
*G06F 3/12* (2006.01)
*H04L 29/06* (2006.01)
(Continued)

(52) U.S. Cl.
CPC ....... *H04L 63/083* (2013.01); *G03G 15/5091* (2013.01); *G06F 21/608* (2013.01);
(Continued)

(58) Field of Classification Search
CPC ..... H04W 12/06; H04W 12/60; H04W 8/005; H04W 60/00; H04W 12/08; H04L 9/3226;
(Continued)

(56) References Cited

U.S. PATENT DOCUMENTS 5,202,989 A * 4/1993 Hirosawa ................ G06F 9/505
709/249
7,257,374 B1 8/2007 Creigh
(Continued)

FOREIGN PATENT DOCUMENTS

CN 101132617 A 2/2008
EP 2410512 1/2012
(Continued)

OTHER PUBLICATIONS

Wi-Fi Alliance®, "Wi-Fi Certified Wi-Fi Direct™", Oct. 2010, pp. 1-6.
(Continued)

*Primary Examiner* — Benny Q Tieu
*Assistant Examiner* — Juan M Guillermety
(74) *Attorney, Agent, or Firm* — Staas & Halsey LLP

(57) ABSTRACT

A method of controlling job authority of an image forming apparatus that supports a P2P connection includes: storing a profile of a wireless device that is P2P connected to the image forming apparatus in the image forming apparatus; receiving and storing job authority information corresponding to the profile; when the wireless device requests the image forming apparatus to execute an operation, setting a job authority of the wireless device by using the profile and the job authority information; and checking the job authority of the wireless device by the image forming apparatus, and executing the requested job when the wireless device has the authority to perform the requested job.

21 Claims, 11 Drawing Sheets

(51) Int. Cl.
  *G06F 21/60* (2013.01)
  *H04N 1/44* (2006.01)
  *H04W 12/06* (2009.01)
  *H04W 12/08* (2009.01)
  *G03G 15/00* (2006.01)

(52) U.S. Cl.
  CPC ......... *H04L 63/102* (2013.01); *H04N 1/4433* (2013.01); *H04W 12/06* (2013.01); *H04W 12/08* (2013.01); *G06F 3/1222* (2013.01); *G06F 3/1238* (2013.01); *G06F 3/1292* (2013.01)

(58) Field of Classification Search
  CPC ..... H04L 12/66; H04L 63/063; H04L 63/102; H04L 63/083; G06F 3/1222; G06F 3/1236; G06F 3/1238; G06F 3/1292; G06F 3/1204; G06F 3/1205; G06F 3/1226; G06F 3/1273; G06F 21/606; G06F 21/608; H04N 2201/0094; H04N 2201/0096; H04N 1/4433; G03G 15/5091
  USPC .............. 358/1.14, 1.15; 455/41.1–41.3, 566
  See application file for complete search history.

(56) References Cited

U.S. PATENT DOCUMENTS

| | | | | |
|---|---|---|---|---|
| 7,706,008 | B2* | 4/2010 | Fukao | G06F 21/608 358/1.15 |
| 8,285,210 | B2* | 10/2012 | Oshima et al. | 358/1.15 |
| 8,625,488 | B1* | 1/2014 | Gogate et al. | 370/328 |
| 2003/0156567 | A1 | 8/2003 | Oak | |
| 2005/0078337 | A1* | 4/2005 | Ichikawa | G06F 3/1238 358/1.15 |
| 2005/0270569 | A1* | 12/2005 | Hayashi | 358/1.15 |
| 2006/0130122 | A1* | 6/2006 | Konno | H04W 12/06 726/2 |
| 2008/0021933 | A1* | 1/2008 | Ono | 707/201 |
| 2008/0052710 | A1 | 2/2008 | Iwai et al. | |
| 2008/0137121 | A1 | 6/2008 | Chrisop et al. | |
| 2009/0082029 | A1* | 3/2009 | Holcman | H04L 67/306 709/223 |
| 2009/0323112 | A1* | 12/2009 | Kamei et al. | 358/1.15 |
| 2010/0014111 | A1 | 1/2010 | Konno | |
| 2010/0069008 | A1 | 3/2010 | Oshima et al. | |
| 2010/0195135 | A1 | 8/2010 | Ohba | |
| 2010/0232405 | A1* | 9/2010 | Kikuchi | 370/338 |
| 2010/0315668 | A1* | 12/2010 | Aoki | 358/1.15 |
| 2011/0026504 | A1 | 2/2011 | Feinberg | |
| 2011/0051163 | A1* | 3/2011 | Roche et al. | 358/1.13 |
| 2011/0082940 | A1* | 4/2011 | Montemurro et al. | 709/227 |
| 2011/0085529 | A1 | 4/2011 | Choi et al. | |
| 2012/0033245 | A1* | 2/2012 | Kurahashi | G06F 3/1204 358/1.14 |

FOREIGN PATENT DOCUMENTS

| | | |
|---|---|---|
| JP | 2006-163793 | 6/2006 |
| JP | 2006-333247 | 12/2006 |
| JP | 2010-178054 | 8/2010 |
| WO | WO 02/41107 | 5/2002 |
| WO | WO2008/144520 | 11/2008 |

OTHER PUBLICATIONS

Extended European Search Report issued Dec. 6, 2012, in corresponding European Patent Application No. 12182398.3.
Extended European Search Report issued Dec. 13, 2012, in corresponding European Patent Application No. 12182403.1.
Extended European Search Report issued Dec. 10, 2012, in corresponding European Patent Application No. 12182405.6.
Extended European Search Report issued Dec. 6, 2012, in corresponding European Patent Application No. 12182400.7.
Extended European Search Report issued Dec. 6, 2012, in corresponding European Patent Application No. 12182412.2.
PCT International Search Report filed Aug. 31, 2012, in corresponding PCT Patent Application No. PCT/KR2012/006976.
"Dynamic Host Configuration Protocol", Wikipedia, Aug. 30, 2011.
Chinese Office Action dated Jan. 5, 2017 in corresponding Chinese Patent Application No. 201210321655.X.

* cited by examiner

FIG. 15

| Catogories | Print | Copy | Scan/Fax | Admin Settings | Share Folder | Group | PIN code |
|---|---|---|---|---|---|---|---|
| SmartPhone01 | unlocked | locked | unlocked | locked | ulocked | A | xxxx |
| SmartPhone02 | unlocked | locked | unlocked | locked | ulocked | A | xxxx |
| SmartPhone03 | unlocked | locked | unlocked | locked | ulocked | A | xxxx |
| SmartPhone04 | unlocked | locked | unlocked | locked | ulocked | A | xxxx |
| SmartPhone05 | unlocked | locked | unlocked | unlocked | ulocked | B | oooo |
| SmartPhone06 | unlocked | locked | unlocked | locked | ulocked | A | xxxx |
| SmartPhone07 | unlocked | locked | unlocked | locked | ulocked | A | xxxx |
| SmartPhone08 | unlocked | locked | unlocked | locked | ulocked | A | xxxx |
| SmartPhone09 | unlocked | locked | unlocked | unlocked | ulocked | B | oooo |

IMAGE FORMING APPARATUS SUPPORTING PEER-TO-PEER CONNECTION AND METHOD OF CONTROLLING JOB AUTHORITY THEREOF

CROSS-REFERENCE TO RELATED APPLICATIONS

This application claims priority benefit of Korean Patent Application No. 10-2011-0089252, filed on Sep. 2, 2011, in the Korean Intellectual Property Office, the disclosure of which is incorporated herein in its entirety by reference.

BACKGROUND

1. Field

The present invention relates to an image forming apparatus supporting peer to peer (P2P) connection, and more particularly, to a method of controlling job authorities of an image forming apparatus that supports a P2P connection.

2. Description of the Related Art

Peer to peer (P2P) communication technology, by which wireless devices may be directly connected to each other without an additional wireless connecting apparatus, have been generalized and widely used. For example, BLUETOOTH technology makes P2P communication possible. Although there are limitations in terms of transmission speed and transmission range of BLUETOOTH, new versions of BLUETOOTH are being developed to compensate for the limitations.

In addition, WI-FI, which is a wireless local area network (WLAN) standard based on IEEE 802.11 regulated by the WI-FI ALLIANCE, is basically a technology using ultra-high speed Internet by accessing access points (APs) connected to an infrastructured network; however, the WI-FI may serve the P2P communication by using an ad-hoc function. When the ad-hoc function is used, security is weakened, transmission speed is lowered, and a setting method is not easily performed. Therefore, the WI-FI ALLIANCE has suggested a WI-FI DIRECT technology that makes the P2P communication possible. The WI-FI DIRECT allows P2P connection between wireless devices without using the AP, supports a transmission speed of a maximum of 250 Mbps, and performs security settings by using WI-FI protected access 2 (WPA2), in order to address problems of the ad-hoc function. In addition, the WI-FI DIRECT supports a transmission range of a maximum of 200 m, and thus, is considered as a substitute for the P2P communication.

As described above, with the appearance of the WI-FI DIRECT, utilization of P2P communication is increased. In addition, the P2P communication technology may be also applied to image forming apparatuses such as printers, scanners, facsimiles, and multi-function printers. Therefore, technologies for user authentication, controlling connections, controlling rights, and managing security are necessary for safely and conveniently using image forming apparatuses supporting the P2P connection.

SUMMARY

Additional aspects and/or advantages will be set forth in part in the description which follows and, in part, will be apparent from the description, or may be learned by practice of the invention.

The present invention provides a method of controlling job authorities of an image forming apparatus that supports a peer-to-peer (P2P) connection.

According to an aspect of the disclosure, there is provided a method of controlling job authority of an image forming apparatus that supports a peer-to-peer (P2P) connection, the method including: storing a profile of a wireless device that is P2P connected to the image forming apparatus in the image forming apparatus; receiving and storing job authority information corresponding to the profile; when the wireless device requests the image forming apparatus to execute an operation, setting a job authority of the wireless device by using the profile and the job authority information; and checking the job authority of the wireless device by the image forming apparatus, and executing the requested job when the wireless device has the authority to perform the requested job.

The image forming apparatus may function as an access point (AP) that allows clients on a wireless local area network (WLAN) to be connected to each other or may function as a client on the WLAN. The storing of a generated profile of the wireless device includes receiving device information from the wireless device when the image forming apparatus operates as the AP, and generating a profile using the received device information.

The setting of the job authority may include requesting the wireless device to input a verification code, when the wireless device requests the image forming apparatus to execute a job. Setting the job authority of the wireless device by using the profile and the job authority information, upon receiving the verification code which coincides with a verification code included in the stored job authority information.

The method may further include storing a result of executing the job to be linked with the stored profile and the job authority information, when the execution of the requested job is finished.

The job authority information may regulate the job authority that is allowed to the wireless device according to a device type of the wireless device grasped from the profile of the wireless device.

The method may further include deleting the job authority information corresponding to the profile of the wireless device, when the wireless device is not connected to the image forming apparatus again within a predetermined time period after the wireless device and the image forming apparatus are disconnected from each other.

According to another aspect, there is provided an image forming apparatus that supports a peer-to-peer (P2P) connection, the image forming apparatus including: a communication interface unit connecting to an external wireless device in a P2P connection method; a profile storage unit storing a profile of the wireless device that is connected to the communication interface unit; a job authority information storage unit storing job authority information corresponding to the profile stored in the profile storage unit; a job execution unit executing a job requested by the wireless device; and a control unit setting a job authority of the wireless device by using the profile and the job authority information when the wireless device requests to execute the job, and allowing the job execution unit to execute the requested job when the wireless device has an authority to execute the requested job.

The image forming apparatus may function as an access point (AP) that allows clients on a wireless local area network (WLAN) to be connected to each other or may function as a client on the WLAN, and the profile storage unit may store the profile that is generated by using device information received from the wireless device when the image forming apparatus operates as the AP.

The control unit may request the wireless device to input a verification code through a user interface unit when the wireless device requests the image forming apparatus to execute the job. The control unit sets the job authority of the wireless device by using the profile and the job authority information when the verification code which coincides with a verification code included in the stored job authority information is input.

The image forming apparatus may further include a job execution result storage unit, in which a result of executing the job is stored to be linked with the profile and the job authority information, when the execution of the job is finished.

The job authority information may regulate the job authority that is allowed to the wireless device according to a device type of the wireless device grasped from the profile of the wireless device.

The control unit may delete the job authority information corresponding to the profile of the wireless device, when the wireless device is not connected to the image forming apparatus again within a predetermined time period after the wireless device and the image forming apparatus are disconnected from each other.

BRIEF DESCRIPTION OF THE DRAWINGS

The above and other features and advantages of the present invention will become more apparent by describing in detail exemplary embodiments thereof with reference to the attached drawings in which:

FIG. 15 is a diagram showing profiles of a plurality of smartphones stored in the multi-function printer supporting the WI-FI DIRECT according to an embodiment of the present invention.

DETAILED DESCRIPTION

Figure 1:
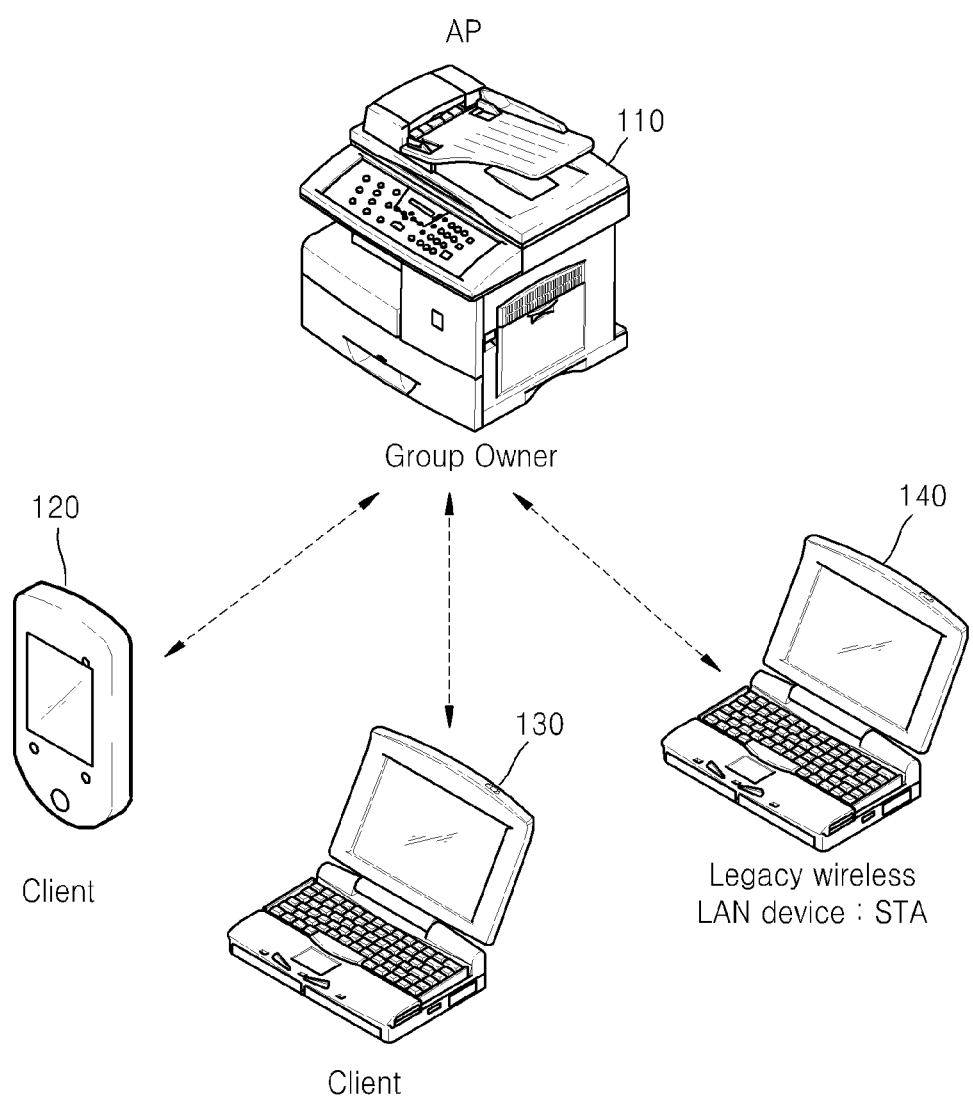
FIG. 1 is a diagram showing devices supporting WI-FI DIRECT and legacy wireless local area network (WLAN) devices that are wirelessly connected to each other to form a wireless network.

Reference will now be made in detail to the embodiments, examples of which are illustrated in the accompanying drawings, wherein like reference numerals refer to the like elements throughout. The embodiments are described below to explain the present invention by referring to the figures.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Like numbers refer to like elements throughout.

Expressions such as "at least one of," when preceding a list of elements, modify the entire list of elements and do not modify the individual elements of the list.

Hereinafter, a multi-function printer (MFP) that supports WI-FI DIRECT will be described as an example of an image forming apparatus supporting a peer-to-peer (P2P) connection. However, the scope of the present invention to be protected is not limited thereto, but is defined by descriptions of claims.

Before describing embodiments of the present invention, a basic connections and operations of an MFP that supports the WI-FI DIRECT will be described with reference to accompanying drawings.

FIG. 1 is a diagram showing wireless local area network (WLAN) devices supporting WI-FI DIRECT and a legacy WLAN device connecting to each other to form a wireless network. Referring to FIG. 1, an MFP 110 supporting the WI-FI DIRECT is wirelessly connected to a smartphone 120 supporting the WI-FI DIRECT, a laptop computer 130 supporting the WI-FI DIRECT, and a legacy WLAN laptop computer 140. Here, the legacy WLAN laptop computer 140 denotes a conventional laptop computer which adopts a WLAN technology and does not support the WI-FI DIRECT.

The WLAN device supporting the WI-FI DIRECT (hereinafter, referred to as "WI-FI DIRECT device") may perform a P2P connection without using an infrastructured network, unlike conventional devices supporting WI-FI. In more detail, according to the conventional WI-FI technology, a WI-FI device is wirelessly connected to a router, that is, an access point (AP), connected to an infrastructured network that is configured in advance to form a wireless network. Here, the WI-FI devices, which are wirelessly connected to the AP, function as stations. However, according to WI-FI DIRECT technology, one of the WI-FI DIRECT devices that form the wireless network operates as an AP, and the other WI-FI Direct devices are wirelessly connected to the WI-FI DIRECT device that operates as the AP to operate as stations. Therefore, the wireless network may be formed between the WI-FI DIRECT devices without the AP connected to the infrastructured network. In addition, when the wireless network is formed between the WI-FI DIRECT devices, the legacy WLAN devices such as the WI-FI devices may recognize the WI-FI DIRECT device operates as the AP as an AP and may be wirelessly connected to the WI-FI DIRECT device.

Referring to FIG. 1, the WI-FI DIRECT MFP 110, the WI-FI DIRECT smartphone 120, and the WI-FI DIRECT laptop computer 130 that are the WI-FI DIRECT devices form a wireless network without an AP connected to the infrastructured network. As described above, the WI-FI DIRECT devices may be wirelessly connected to each other to form a P2P group without an AP connected to the infrastructured network. Here, the WI-FI DIRECT MFP 110 operates as the AP, and the device operating as the AP among the WI-FI DIRECT devices is referred to as a group owner (GO) of a P2P group. In addition, the WI-FI smartphone 120 and the WI-FI DIRECT laptop computer 130 are wirelessly connected to the GO, that is, the WI-FI DIRECT MFP 110, to operate as the stations, which are referred to as clients. On the other hand, the legacy WLAN laptop computer 140 that does not support the WI-FI DIRECT recognizes the GO, that is, the WI-FI DIRECT MFP 110, as the AP, and is wirelessly connected to the GO to be connected to the wireless network formed by the WI-FI DIRECT devices.

In FIG. 1, the WI-FI DIRECT MFP 110 operates as the GO; however, any one of the other WI-FI DIRECT devices, that is, the smartphone 120 and the laptop computer 130, may operate as the GO and the MFP 110 may operate as the client. Which of the WI-FI DIRECT devices to become the GO is determined through a negotiation process in WI-FI DIRECT connection processes, and this will be described in detail later. Meanwhile, the WI-FI DIRECT device may be the GO by itself before the connection without any negotiation, and the WI-FI DIRECT device in this case is referred to as an autonomous group owner (AGO). In addition, a wireless network formed based on the AGO is referred to as an autonomous P2P group. When the autonomous P2P group is formed, the legacy WLAN device may recognize the AGO as an AP connected to the infrastructured network and may be connected to the AGO.

Although FIG. 1 shows an example in which the WI-FI DIRECT devices form the P2P group without the AP connected to the infrastructured network, the WI-FI DIRECT devices may operate as the stations by connecting to the AP, if the AP is connected to the infrastructured network.

Hereinafter, wireless connecting processes between the WI-FI DIRECT devices and characteristics of the WI-FI DIRECT technology will be described with reference to the accompanying drawings. For convenience of description, an MFP supporting the WI-FI DIRECT (hereinafter, referred to as "WI-FI DIRECT MFP") will be described as an example; however, the scope of the present invention is not limited thereto, that is, embodiments of the present invention may be applied to printers, scanners, or facsimiles supporting the WI-FI DIRECT. In addition, the WI-FI DIRECT is used as an example of the P2P communication method; however, other kinds of P2P communication such as BLUETOOTH and ZIGBEE may be used within the applicable range of the present invention.

Figure 2:
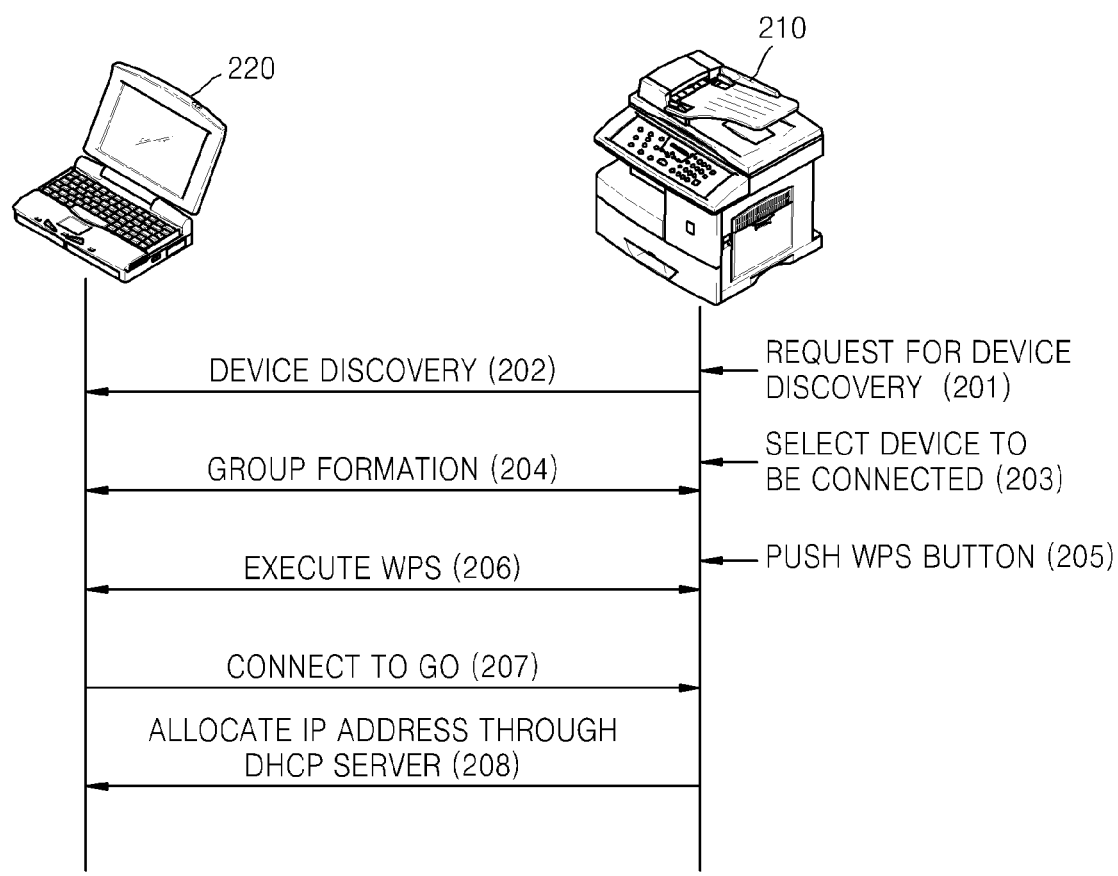
FIG. 2 is a diagram showing processes of wirelessly connecting the devices supporting the WI-FI Direct to each other.

FIG. 2 is a diagram showing processes of wirelessly connecting WI-FI DIRECT devices to each other. In more detail, processes of WI-FI DIRECT connection between a WI-FI DIRECT MFP 210 and a WI-FI DIRECT laptop computer 220 are shown. The WI-FI DIRECT connecting processes may be divided as a device discovery process, a group formation process, and a secure connection process. Referring to FIG. 2, the WI-FI DIRECT MFP 210 receives a request for device discovery from a user, and searches for a WI-FI DIRECT device around it (202). The device discovery request may be input through a user interface of the MFP 210, for example, a user interface realized on a display unit such as a liquid crystal display (LCD) formed in the MFP 210. If it is determined as a result of searching that there is a WI-FI DIRECT device around the MFP 210, the MFP 210 shows the user the searched device through the display unit and receives a connection request 203 from the user. The connection request 203 may be also input through the display unit of the MFP 210 from the user, for example, the user may push buttons or a touch panel of the display unit. If there are a plurality of WI-FI DIRECT devices, the MFP 210 displays a list of the searched WI-FI DIRECT devices on the display unit so that the user may select one of the WI-FI DIRECT devices and request the connection to the selected WI-FI DIRECT device.

After receiving the connection request 203, a group formation is performed between the WI-FI DIRECT devices to be connected (204). The group formation process determines the WI-FI DIRECT devices to be connected to each other and determines the WI-FI DIRECT devices to be the GO or the clients in the group. The WI-FI DIRECT device to be the GO is determined through the negotiation between the WI-FI DIRECT devices, and the negotiation will be described in detail with reference to FIG. 4.

When the group is formed, the devices included in the group are to be securely connected to each other by using a WI-FI protected setup (WPS) technology. The WPS denotes a function of performing simple secure connection between the WI-FI supporting devices. The WPS may be classified as a personal identification number (PIN) type WPS and a push button configuration (PBC) type WPS. The PIN type WPS sets the secure connection by inputting a PIN code that is set in advance, and the PBC type WPS sets the secure connection by pushing a WPS button that is provided on the WI-FI DIRECT device.

Hereinafter, the PBC type WPS will be described as an example. The user pushes a WPS button provided on the MFP 210 to request the secure connection (205). In addition, within a predetermined period of time (in general, 120 seconds), the secure connection may be achieved by pushing a WPS button formed on the laptop computer 220, or a WPS button realized on an application program for WI-FI DIRECT connection in the laptop computer 220. The WPS button realized on the application program for the WI-FI DIRECT connection in the laptop computer 220 may be an object represented on a display unit of the laptop computer 220 by the application program for the WI-FI DIRECT connection. A detailed example of the WPS button is represented as reference numeral 510 in FIG. 5. The user clicks the WPS button represented on the display unit of the laptop computer 220 by using a mouse, for example, to request the secure connection. When the security connection is requested by pushing the WPS button, the device that is determined to be the GO in the group formation process transmits security information to devices determined as the clients (206). According to the WI-FI DIRECT, the secure connection is executed after encrypting in a WI-FI protected access 2 (WPA2)-pre-shared key (PSK) method, and thus, the WI-FI DIRECT may have a higher security function than that of a conventional wired equivalent privacy (WEP) or WI-FI protected access (WAP) method.

When the WPS is executed, the WI-FI DIRECT device that is the client is connected to the WI-FI DIRECT device that is the GO (207). At this time, the WI-FI DIRECT device that is the GO automatically allocates an Internet protocol (IP) address to the WI-FI DIRECT device that is the client by using a dynamic host configuration protocol (DHCP)

server (208), and then, the P2P connection between the WI-FI DIRECT devices is completed.

Basic processes for connecting the WI-FI DIRECT devices have been described so far, and detailed processes and characteristics of the WI-FI DIRECT technology will be described with reference to the accompanying drawings as follows.

Figure 3:
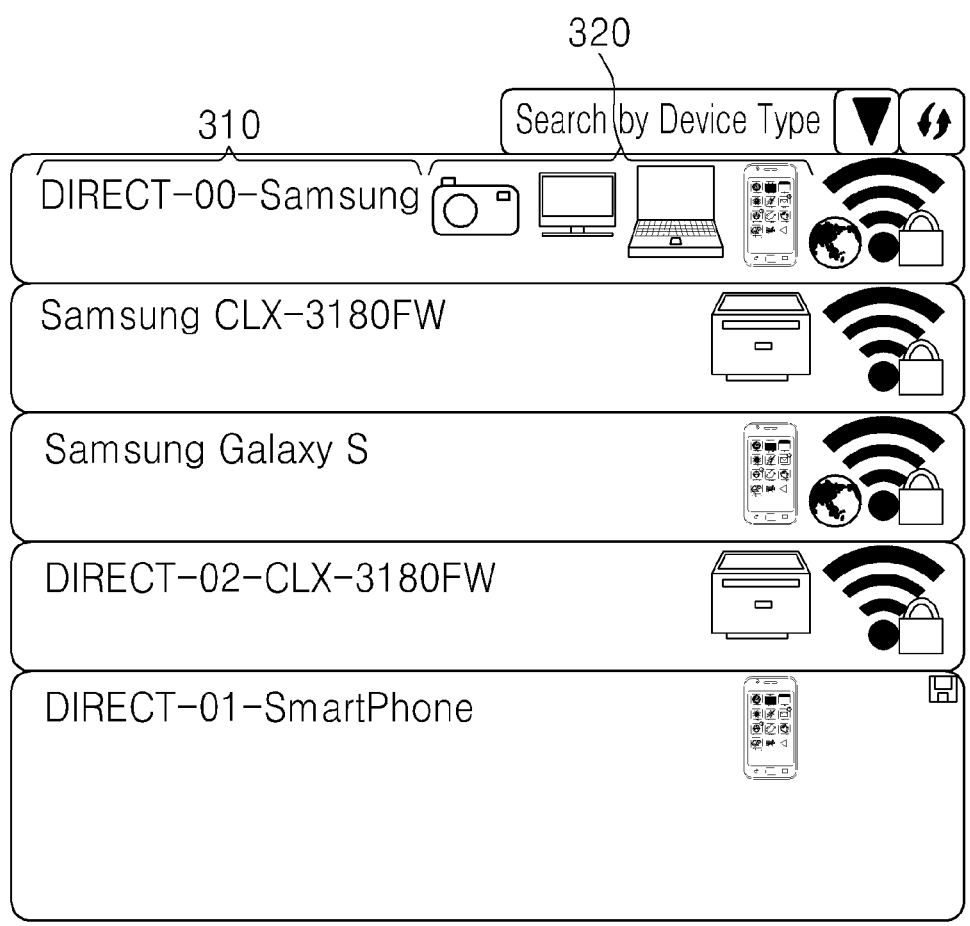
FIG. 3 is a diagram showing an example of displaying a list of WI-FI DIRECT devices that are found after a device discovery process performed by a device supporting the WI-FI DIRECT.

FIG. 3 is a diagram showing an example of displaying a list of the WI-FI DIRECT devices that are searched in the device discovery process in the WI-FI DIRECT device. When the device discovery process is performed by the WI-FI DIRECT device, device information such as a type of the device and a service set identifier (SSID) of the device is exchanged between the devices through a probe request and a probe response that are WLAN packets, and the WI-FI DIRECT device that performs the device discovery process displays the collected information. As shown in FIG. 3, the SSIDs and the types of the searched WI-FI DIRECT devices are represented as text 310 and/or icons 320. Here, all of the searched devices may be represented in the list; however, the devices may be filtered so that the devices of a desired type may be only displayed in the list. According to the WI-FI DIRECT technology, the WI-FI DIRECT devices are defined in category units. The WI-FI DIRECT devices may be classified as categories, for example, computers, input devices, printers, scanners, facsimiles, copying machines, and cameras, and each of the categories is divided into sub-categories. For example, the computer may be classified as personal computers (PCs), servers, laptop computers, and the like.

Figure 4:
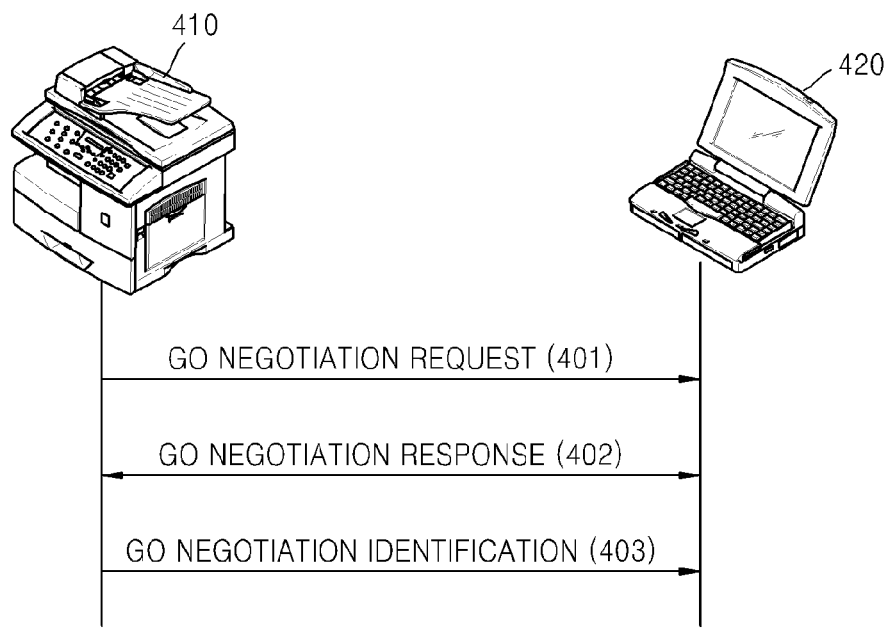
FIG. 4 is a diagram showing a group formation process in the processes of connecting the WI-FI DIRECT supporting devices to each other.

FIG. 4 is a diagram showing the group formation process in detail among the connecting processes between the WI-FI DIRECT devices. The group formation process is a process for determining the WI-FI DIRECT devices that are to form a network, and the WI-FI DIRECT devices to be the GO and the clients. For example, when the WI-FI DIRECT MFP 410 performs the device discovery and selects a laptop computer 420 among the discovered WI-FI DIRECT devices to be connected, the MFP 410 transmits a GO negotiation request 401 to the laptop computer 420. The laptop computer 420 receiving the GO negotiation request 401 compares an intent value thereof with that of the MFP 410, and then, determines the MFP 410 as the GO when the intent value of the MFP 410 is greater than that of the laptop computer 420 and determines the laptop computer 420 as the GO when the intent value of the laptop computer 420 is greater. The intent value is a value representing a degree of task intent in each device, and is determined by manufacturer policy and user settings. The intent value of the device, which is supplied power always, may be set to be relatively high. As described above, after determining the WI-FI DIRECT device to be the GO by comparing the intent values, the laptop computer 420 transmits the determination result to the MFP 410 as a response to the GO negotiation 402. The MFP 410 that receives the determination result and transmits an acknowledgement 403 to the laptop computer 420 in order to verify the receipt of the negotiation, and then, the group formation process is finished. When the group formation is completed, the WI-FI DIRECT device that is the GO manages security information and SSIDs of the other WI-FI DIRECT devices included in the group.

Figure 5:
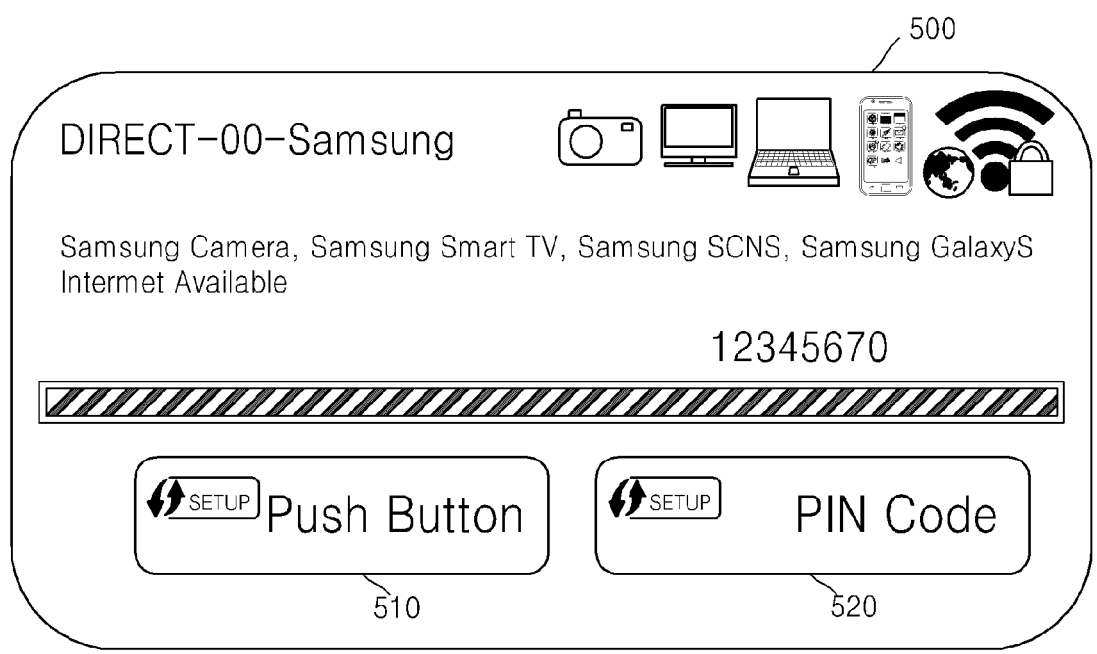
FIG. 5 is a diagram showing a display screen for executing WPS.

When the group is formed, the WI-FI DIRECT devices included in the group are securely connected to each other through the WPS. FIG. 5 is a diagram showing a display screen 500 for executing the WPS. The screen of FIG. 5 may be displayed on a display unit of the WI-FI DIRECT MFP. Referring to FIG. 5, the user may select one of a WPS button 510 and a PIN code 520 for executing the WPS. When the WPS is executed through the WPS button 510, the WPS button 510 of the WI-FI DIRECT MFP is pushed and WPS buttons of other devices are pushed within a predetermined period of time, and then, security information is exchanged between the devices automatically and the secure connection is made. Here, the WI-FI DIRECT device that is the GO provides security information to the WI-FI DIRECT devices that are the clients. In addition, the secure connection is performed after encrypting in the WPA2-PSK verification method, and thus, high security may be achieved.

Figure 6:
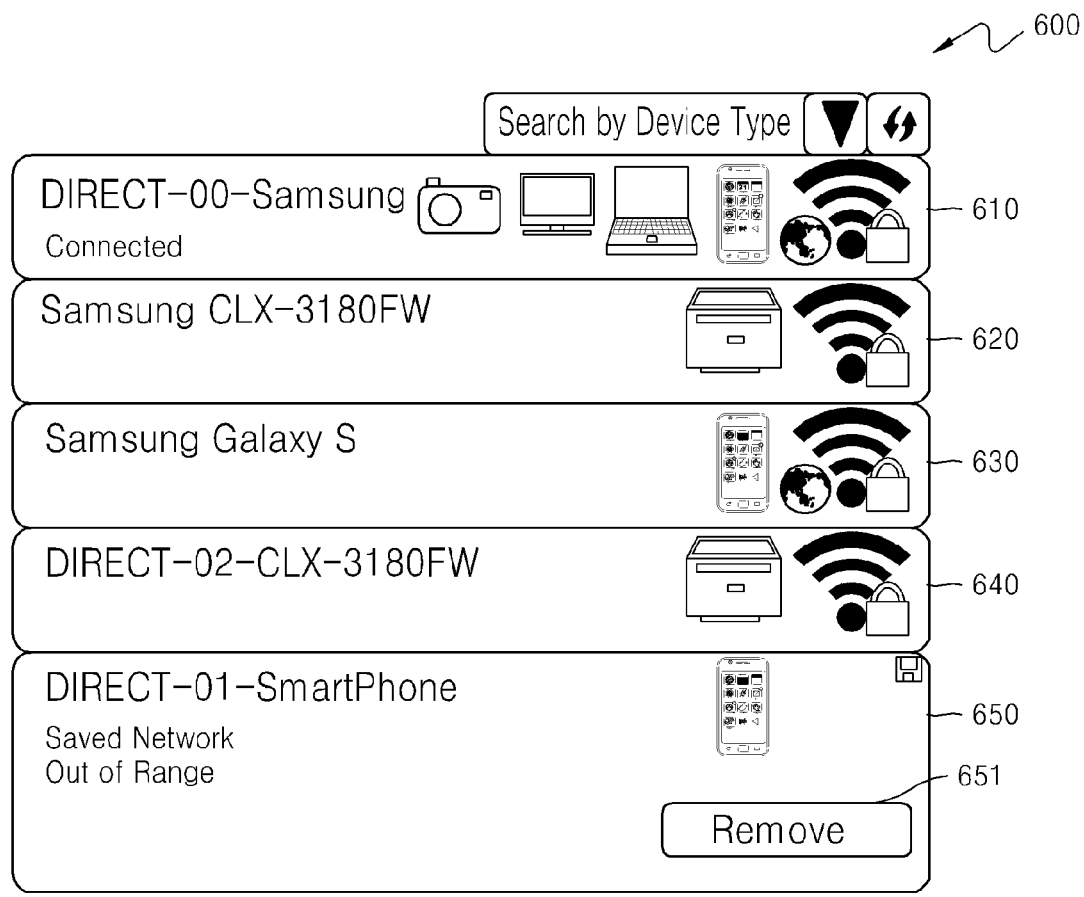
FIG. 6 is a diagram showing a list of devices, information of which is stored, supporting WI-FI DIRECT according to a profile storing function.

The WI-FI DIRECT devices have a profile storage function that is for storing information of the WI-FI DIRECT devices connected once thereto. FIG. 6 is a diagram showing a list of the WI-FI DIRECT devices, information of which is stored according to the profile storage function. The list of FIG. 6 is a screen displayed on the display unit of the WI-FI DIRECT MFP. Information of a first list 610 denotes a WI-FI DIRECT device currently connected to the WI-FI DIRECT MFP, information of second through fourth lists 620-640 denotes WI-FI DIRECT devices that are not currently connected to the WI-FI DIRECT MFP, but are included in a device discovery range of the WI-FI DIRECT MFP, and information of a fifth list 650 denotes a WI-FI DIRECT device that has been connected at least once to the WI-FI DIRECT device although that is not discovered currently. If the information of the fifth list 650 is not necessary, the user may delete the fifth list 650 by pushing a remove button 651. Since the WI-FI DIRECT device has the profile storage function as described above, the WI-FI DIRECT device stores information of the other WI-FI DIRECT devices connected at least once thereto, and then, may be connected fast without executing the WPS by using the stored information in a case where the same device tries to connect thereto again.

Figure 7:
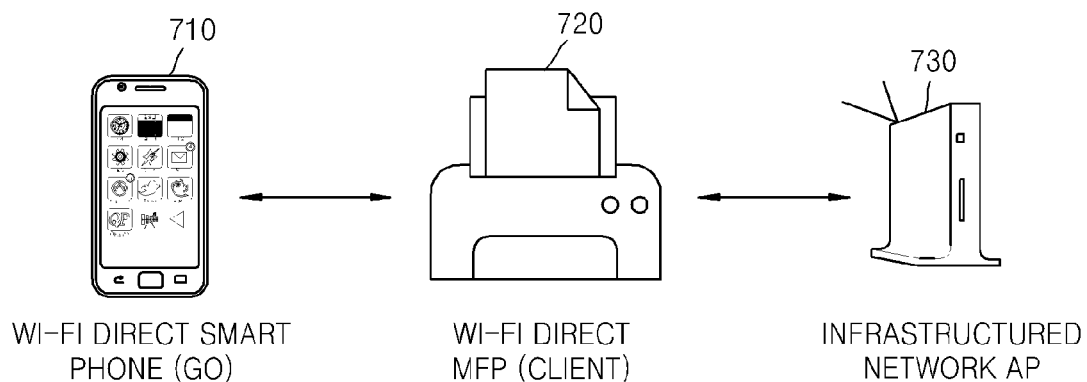
FIG. 7 is a diagram showing WI-FI DIRECT supporting devices that are simultaneously connected to each other.

The WI-FI DIRECT device may be P2P connected to another WI-FI DIRECT device, and at the same time, may be connected to the infrastructured network, which is referred to as a concurrent connection. FIG. 7 is a diagram showing the WI-FI DIRECT devices that are in the concurrent connection states. Referring to FIG. 7, the WI-FI DIRECT MFP 720 is P2P connected to a smartphone 710 that is another WI-FI DIRECT device, and at the same time, the WI-FI DIRECT MFP 720 is also connected to an AP 730 of the infrastructured network. The WI-FI DIRECT MFP 720 may directly transmit/receive print data to/from the smartphone 710, and at the same time, may directly transmit/receive print data to/from the infrastructured network through the AP 730 of the infrastructured network.

When the WI-FI DIRECT device is concurrently connected to the WI-FI DIRECT device and the infrastructured network as shown in FIG. 7, or when the WI-FI DIRECT device is wired connected to the infrastructured network and P2P connected to another WI-FI DIRECT device, different IP addresses and MAC addresses with respect to the connections, that is, the connection to the infrastructured network and the connection to the another WI-FI DIRECT device, may be used. Through a multi-homing technology, the WI-FI DIRECT device may provide the devices with different services from each other. For example, the WI-FI DIRECT MFP may provide services of all functions of the MFP through an interface connected to the infrastructured network; however, the WI-FI DIRECT MFP may provide services of partial functions of the MFP through an interface connected to another WI-FI DIRECT device.

Figure 8:
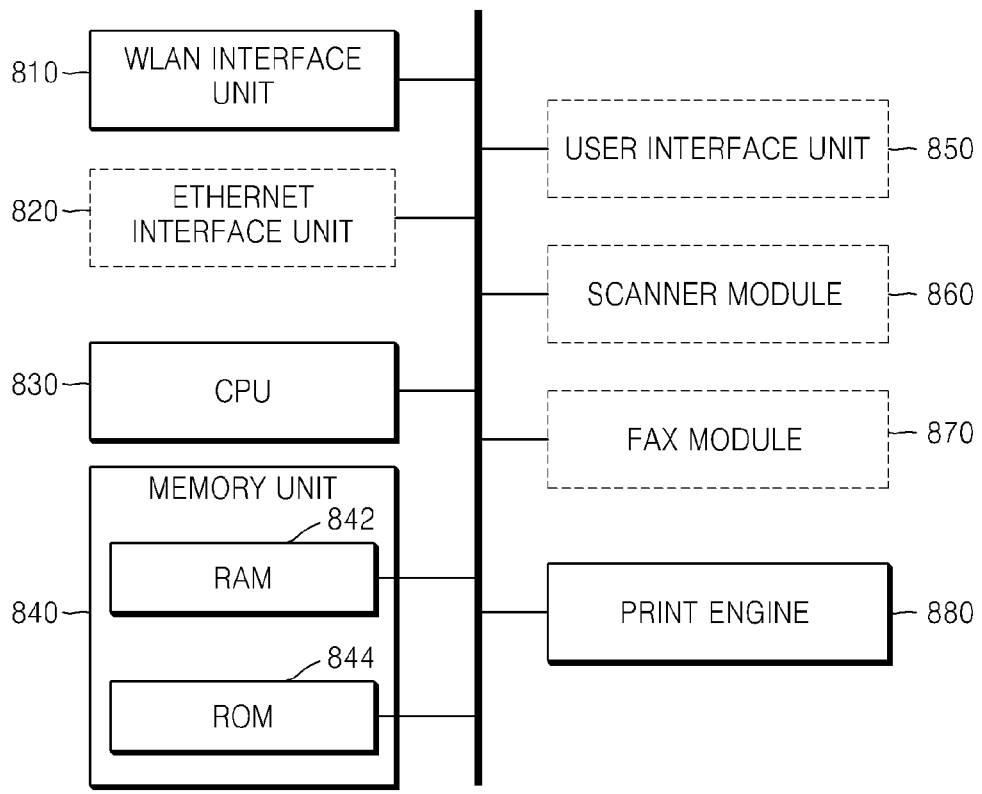
FIG. 8 is a block diagram showing a hardware configuration of a multi-function printer supporting the WI-FI DIRECT according to an embodiment of the present invention.

FIG. 8 is a block diagram showing a hardware configuration of the WI-FI DIRECT MFP. Referring to FIG. 8, the WI-FI DIRECT MFP may include a WLAN interface module 810, an Ethernet interface module 820, a central processing unit (CPU) 830, a memory unit 840, a user interface module 850, a scanner module 860, a fax module 870, and a print engine 880. In addition, the memory unit 840 may include a random access memory (RAM) 842 and a read only memory (ROM) 844. If the MFP only supports the WLAN, the MFP may not include the Ethernet interface module 820. In addition, if the device is a printer, rather than the MFP, the scanner module 860 and the fax module 870 are not necessary.

The WLAN interface module 810 is hardware performing IEEE 802.11b/g/n function, and may communicate with a main board, on which the CPU 830 is mounted, of the MFP via a universal serial bus (USB). The Ethernet interface module 820 is hardware for performing wired Ethernet communication according to IEEE 802.3. The CPU 830 controls overall operations of the MFP, and the memory unit 840 stores information for controlling the MFP and the print data to be read when it is necessary. The user interface module 850 functions as a medium for the user to identify information of the MFP and to input commands into the MFP. The user interface module 850 may be variously modified according to products, for example, may be configured as two or four lines displayed on a display unit such as an LCD or a light emitting diode (LED), or may be realized as a graphic user interface (UI) so as to represent various graphics. The scanner module 860, the fax module 870, and the print engine 880 are hardware for performing functions of a scanner, a facsimile, and a printer.

Figure 9:
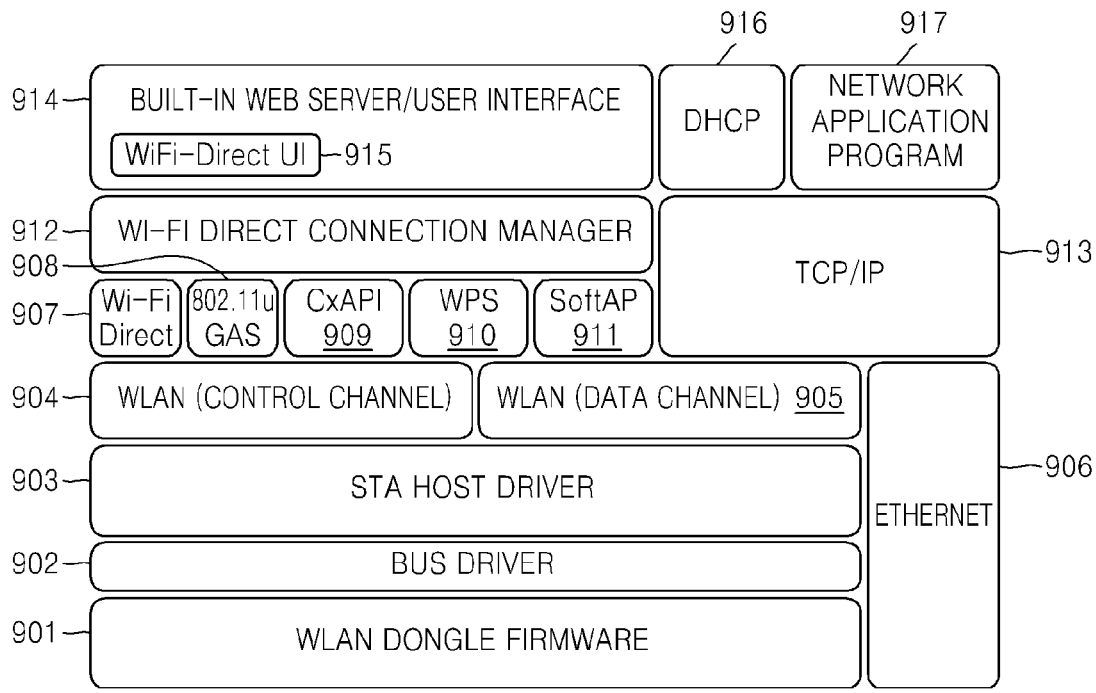
FIG. 9 is a block diagram showing a software configuration of the multi-function printer supporting the WI-FI DIRECT of FIG. 8.

FIG. 9 is a block diagram showing software configuration of the WI-FI DIRECT MFP. The configuration of the software in the WI-FI DIRECT MFP will be described with reference to FIG. 9 as follows.

A WLAN dongle firmware 901 is a firmware for connecting the WLAN, and may be stored in WLAN dongle hardware or may be transmitted to the WLAN dongle hardware from a main board of the MFP when booting the MFP. A bus driver 902 and a station (STA) host driver 903 are low level bus drivers for communicating with the WLAN hardware. A WLAN controlling channel 904 and a WLAN data channel 905 are channels for communicating with the WLAN firmware. A WI-FI DIRECT module 907 performs the WI-FI DIRECT connection and transmits an operating command to the WLAN firmware. An IEEE 802.11u generic advertisement service (GAS) module 908 performs functions according to IEEE 802.11u GAS, and a WPS module 910 performs a WPS function. A soft AP module 911 is a software module allowing the MFP to perform as the AP. A transmission control protocol (TCP)/IP 913 is a standard protocol for network transmission. A WI-FI DIRECT connection manager 912 is a module for controlling the WI-FI DIRECT connection. A WI-FI DIRECT user interface 915 allows the user to perform settings related to the WI-FI DIRECT, and may be included in a user interface 914 that is installed in an embedded web server (EWS). A DHCP server 916 automatically allocates an IP to the WI-FI DIRECT device that is connected as a client. A network application program 917 performs various application operations relating to the network.

The above-described WI-FI DIRECT technology has the following advantages.

The WI-FI DIRECT device may be connected to other devices whenever and wherever, and thus, has maximum mobility and portability. If a new WI-FI DIRECT device is added, the WI-FI DIRECT device may be directly connected to the new WI-FI DIRECT device. In addition, it may be identified whether there is an available device or service before setting the connection to other devices, and thus, the WI-FI DIRECT devices may be conveniently used. In addition, the connection may be performed simply and stably by a simple operation, for example, pushing a WPS button, and the connection may be performed with high security functions by using the WPA2 technology.

In addition, the WI-FI DIRECT technology may provide various functions that may not be provided by the conventional WLAN technology.

For example, the device discovery function for searching for peripheral WI-FI DIRECT devices by the device type unit, the service discovery function that may search for services provided by the peripheral WI-FI DIRECT devices, a power management function that may effectively use electric power, the concurrent connection function that may form the P2P connection between the WI-FI DIRECT devices while connecting to the conventional infrastructured network, a function of separating a security domain between the infrastructure network connection and the WI-FI DIRECT connection, and a cross connection function for sharing an Internet connection may be provided by the WI-FI DIRECT technology.

In addition, since the WI-FI DIRECT technology is based on the conventional WLAN technology, that is, IEEE 802.11, the WI-FI DIRECT devices may be compatible with conventional legacy WLAN devices.

Hereinafter, a method of controlling job authorities of a WI-FI DIRECT MFP according to an embodiment of the present invention will be described with reference to FIGS. 10 through 15.

Figure 10:
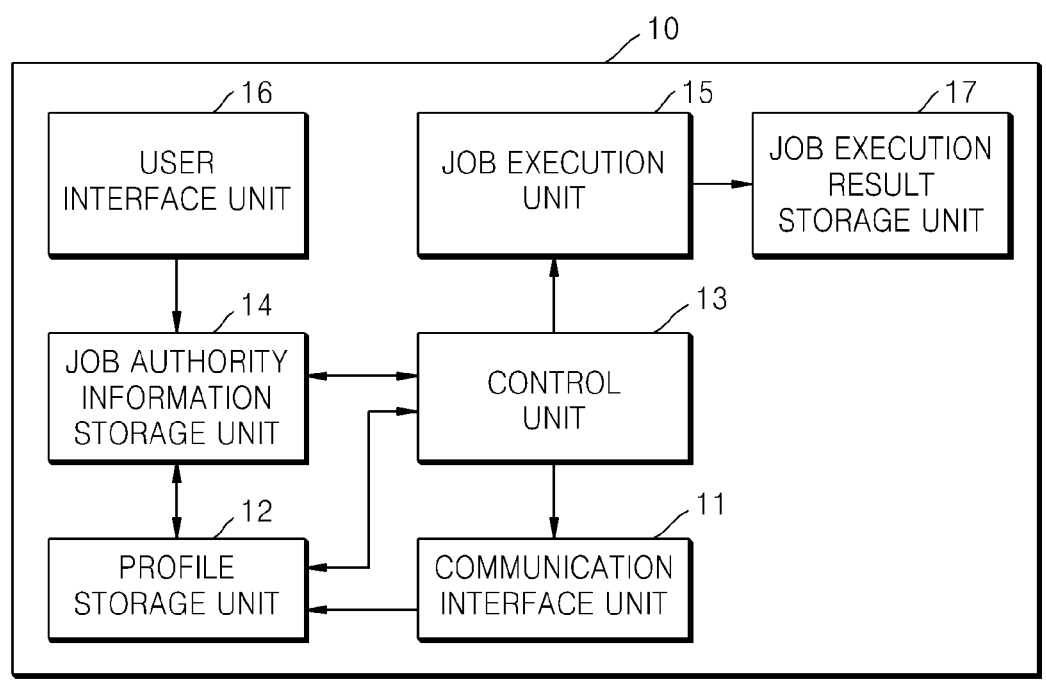
FIG. 10 is a block diagram showing a detailed configuration of a multi-function printer supporting WI-FI DIRECT according to an embodiment of the present invention.

FIG. 10 is a block diagram showing a detailed configuration of a WI-FI DIRECT MFP according to an embodiment of the present invention. Featured components, which are necessary in executing the method of controlling job authorities, of the WI-FI DIRECT MFP 10 are only shown in FIG. 10 under the assumption that the basic hardware configuration of the WI-FI DIRECT MFP shown in FIG. 8 is included in the WI-FI DIRECT MFP 10. For example, a communication interface unit 11 of FIG. 10 corresponds to the WLAN interface unit 810 of FIG. 8, a profile storage unit 12, a job authority information storage unit 14, and a job execution result storage unit 17 of FIG. 10 are included in the memory unit 840 of FIG. 8, a control unit 13 and a job execution unit 15 of FIG. 10 are included in the CPU 830 of FIG. 8, and a user interface unit 16 of FIG. 10 corresponds to the user interface unit 850 of FIG. 8. Basic components of the MFP such as the print engine 880, the fax module 870, and the scanner module 860 shown in FIG. 8 are not shown in FIG. 10.

Referring to FIG. 10, the WI-FI DIRECT MFP 10 according to the present embodiment includes the communication interface unit 11, the profile storage unit 12, the control unit 13, the job authority information storage unit 14, the job execution unit 15, the user interface unit 16, and the job execution result storage unit 17. Functions and operations of each component in the WI-FI DIRECT MFP 10 will be described in more detail with reference to the flowcharts of FIGS. 11 through 14.

FIGS. 11 through 14 are flowcharts illustrating a method of controlling job authority in the WI-FI DIRECT MFP 10 according to an embodiment of the present invention.

Figure 11:
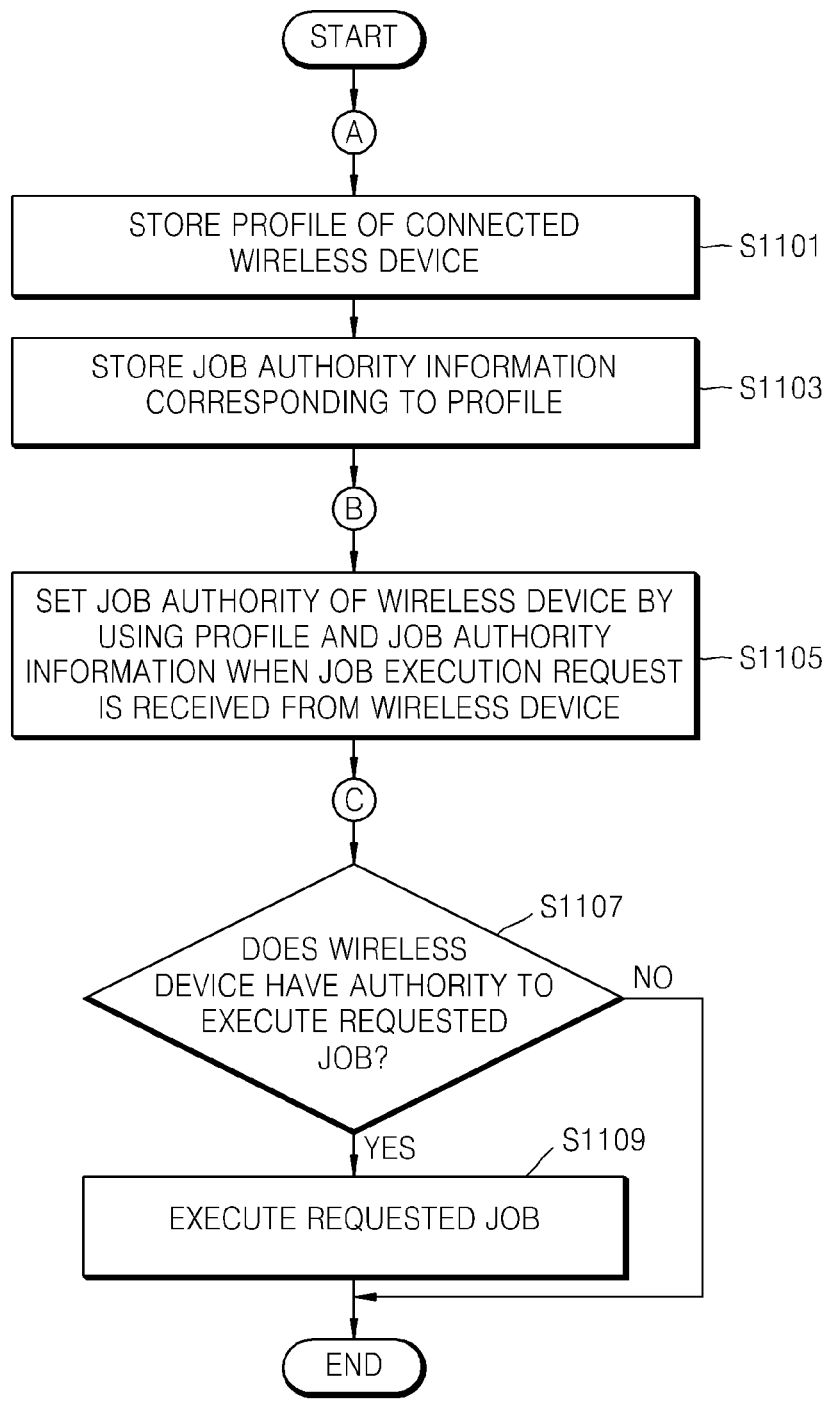
FIGS. 11 through 14 are flowcharts illustrating a method of controlling job authorities of the multi-function printer supporting the WI-FI DIRECT of FIG. 10.

Referring to FIG. 11, the MFP 10 stores profiles of a wireless device that is WI-FI DIRECT connected to the MFP 10 through the communication interface unit 10 (S1101). The profile of the wireless device is stored in the profile storage unit 12. The profile of the wireless device denotes a storage of device information corresponding to each wireless device. That is, the profile of the wireless device may be generated and stored by using the device information of the wireless device, and the stored profile includes the device information of the corresponding wireless device. The profile storage of the wireless device is described in detail above with reference to FIG. 6. After storing the profile of the wireless device, the MFP 10 stores job authority information corresponding to the stored profile in the job authority storage unit 14 (S1103). Here, the job authority information is information that is necessary to set a job authority of the wireless device by using the profile of the wireless device. That is, it may be identified what kind of job authority is allowed for the corresponding wireless device according to the information such as the device name or the device type grasped from the profile, by using the job authority information. The job authority denotes an authority for the wireless device to perform an operation such as printing or copying through the MFP 10.

Figure 12:
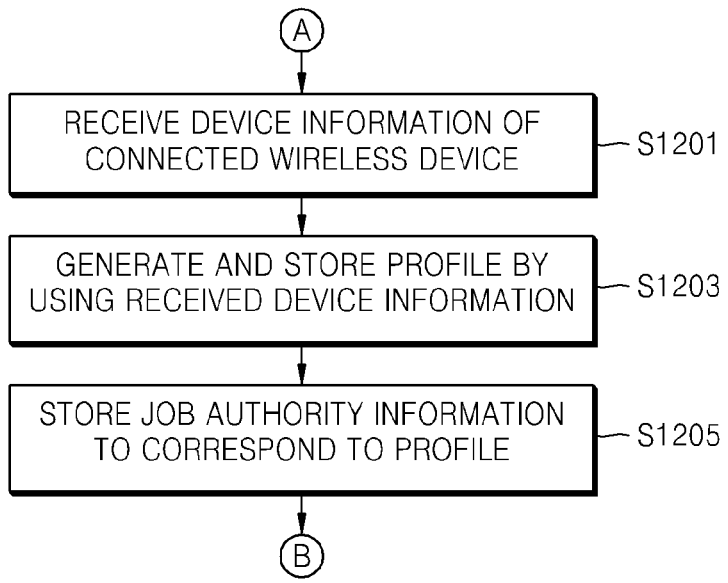

Detailed processes of operations S1101 and S1103, in which the wireless device is registered and the job authority is set, are illustrated in FIG. 12. In more detail, when the wireless device is connected to the MFP 10 through the WI-FI DIRECT connecting processes shown in FIG. 2, the MFP 10 receives device information of the wireless device by using the device discovery function (S1201), and generates the profile by using the received device information and stores the profile in the profile storage unit 12 (S1203). Refer to description with reference to FIG. 6 about the generation and storage of the profile of the wireless device connected to the MFP 10. FIG. 15 shows an example of storing profiles of wireless devices. In FIG. 15, profiles generated by host names of a plurality of smartphones are stored. Profiles of smartphone 01 through smartphone 09 are generated and stored. Here, when storing the profiles, the user may be notified the storage of profile through the user interface unit 16, and then, the profile may be stored when the user identifies the notification.

After storing the profiles, a manager or a user having an authority to set the job authority checks the profiles of the registered wireless device through the user interface unit 16 of the MFP 10, and stores the job authority information to correspond to the profile of each wireless device (S1205). The allocated job authority information is stored in the job authority information storage unit 14 of the MFP 10. Here, according to the job authority information, the job authority may be set by the device type of the wireless device, or may be set by model groups in the same kind of device type. For example, the printing and copying operations are all allowed for the laptop computers, while accessing the files stored in the MFP is only allowed for the storage devices.

In addition, the job authority information may include verification codes for verifying the wireless devices. When an external wireless device requests the MFP 10 to perform a certain job, the MFP 10 performs a verification of the wireless device, and sets the job authority of the wireless device by using the profile and the job authority information after the verification. Here, for verifying the wireless device, the MFP 10 requests input of a verification code, and determines that the verification has succeeded when the verification code stored in the job authority information is input. For example, when the job authority information including a PIN code is stored and the wireless device connected to the MFP 10 to request an execution of operation, the MFP 10 requests the wireless device to input the PIN code, and then, the MFP 10 sets the job authority of the wireless device when the PIN code allocated to the wireless device is input accurately.

Referring to FIG. 11, when the job execution request is received from the wireless device, the control unit 13 sets the job authority of the wireless device by using the profile stored in the profile storage unit 12 and the job authority information stored in the job authority storage unit 14 (S1105). When the job authority of the wireless device is set, the control unit 13 checks whether the wireless device has the authority to execute the requested job (S1107). When it is identified that the wireless device has the authority, the control unit 13 allows the MFP 10 to execute the requested job (S1109). In addition, when the execution of the job is finished, the job execution information may be stored in the job execution result storage unit 17 in linkage with the profile information of the wireless device.

Figure 13:
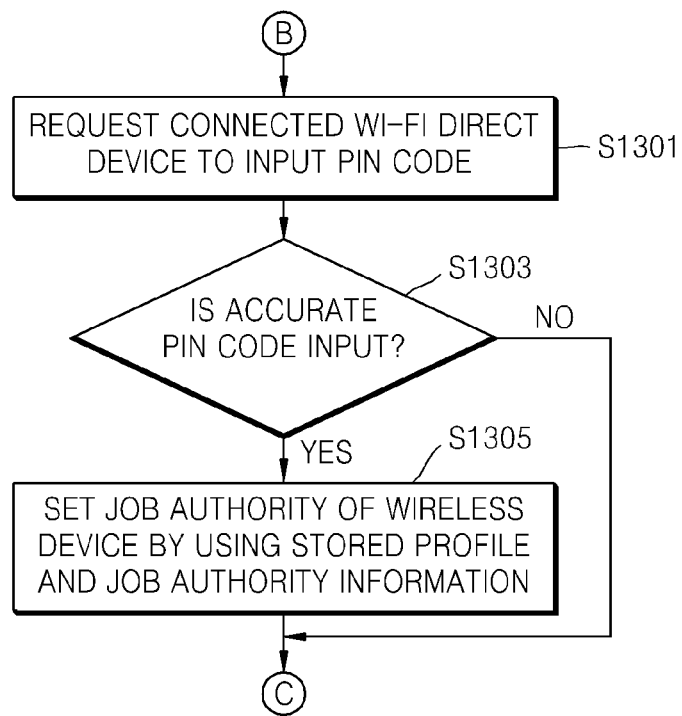

FIG. 13 is a flowchart illustrating detailed processes in the operation S1105 of FIG. 11. Referring to FIG. 13, when the wireless device requests the MFP 10 to execute an operation, the MFP 10 requests the wireless device to input the PIN code included in the job authority information (S1301). When the PIN code is input, the control unit 13 checks whether the accurate PIN code is input (S1303), and when it is determined that the PIN code is input accurately, the control unit 13 sets the job authority of the wireless device by using the profile stored in the profile storage unit 12 and the job authority information stored in the job authority storage unit 14 (S1305).

Figure 14:
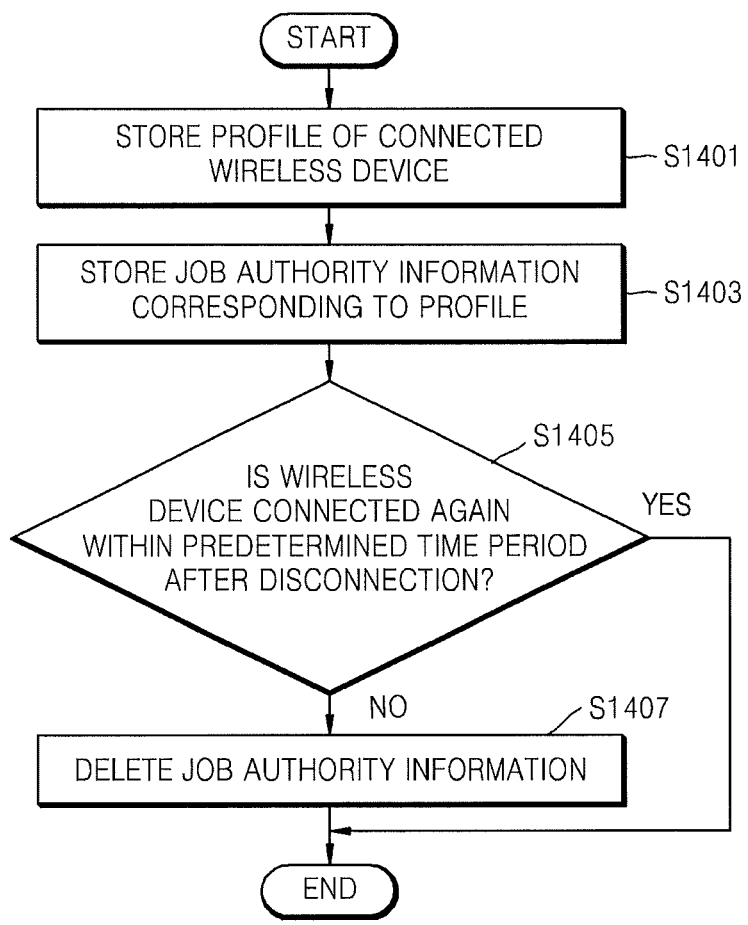

FIG. 14 is a flowchart illustrating a method of deleting job authority information corresponding to the profile of the wireless device, when there is no reconnection within a predetermined time period after the connection of the wireless device to the MFP 10 is disconnected. Referring to FIG. 14, the MFP 10 stores the profile of the wireless device that is WI-FI DIRECT connected to the MFP 10 through the communication interface unit 11 (S1401). The profile of the wireless device is stored in the profile storage unit 12. After storing the profile of the wireless device, the MFP 10 stores the job authority information corresponding to the stored profile in the job authority information storage unit 14 (S1403). When the wireless device is disconnected from the MFP 10, it is identified whether the wireless device is connected to the MFP 10 again within a predetermined time period. If the wireless device is not connected to the MFP 10 within the predetermined time period, the job authority information corresponding to the profile of the wireless device is deleted from the job authority information storage unit 14 (S1407). As described above, by deleting the job authority information of the wireless device that is not connected to the MFP 10 for the predetermined time, unnecessary consumption of the storage space in the job authority information storage unit 14 may be prevented.

User-based verification and the authority setting processes are only provided, and thus, a process of registering the user has to be additionally performed and personal information of the user has to be stored. In addition, a log-in process is necessary to verify the user, and a verification server is necessary. In particular, in public spaces, there may be a problem in maintaining security when user ID is exposed. However, according to the present invention, the job authority is set and controlled for each wireless device, and thus, an additional process for verifying the user and the verification server are not necessary. In addition, possibility of leaking the personal information and the security threat may be greatly reduced.

Also, when the user using the wireless device is changed, a new user has to be registered again. However, there is no need to perform the registration of a new user according to the present invention.

In addition, information about the WI-FI DIRECT connection is stored and linked with the executed job information, and thus, the wireless device is reconnected to the MFP, the verification and the operation control may be performed by using the stored information.

According to the present invention, the job authority is set and controlled according to each of the wireless devices, and thus, an additional process for verifying the user and the verification server are not necessary. In addition, possibility of leaking the personal information and the security threat may be greatly reduced. Also, even when the user of the wireless device is changed, an additional registration process is not necessary.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of controlling job authority of an image forming apparatus that supports a peer-to-peer (P2P) connection with a plurality of different types of wireless devices, the method comprising:
    searching for at least one of a plurality of different types of wireless devices capable of a P2P connection;
    selecting, via a user interface, one of the at least one wireless devices and establishing a connection with the selected wireless device to receive information about the selected wireless device;
    storing a profile of the selected wireless device that is P2P connected to the image forming apparatus in the image forming apparatus;
    receiving and storing job authority information corresponding to the stored profile;
    if the selected wireless device requests the image forming apparatus to execute an operation, setting an extent of a job authority allowed for the selected wireless device by using the stored profile and the job authority information; and
    checking the job authority of the selected wireless device by the image forming apparatus, and executing the requested job when the selected wireless device has the authority to perform the requested job based on the set extent of the job authority,
    wherein the job authority information is information that is necessary to set the extent of the job authority of the wireless device based on a device type of the wireless device or a model group in a same kind of the device type of the wireless device, and
    wherein the job authority denotes an authority for the wireless device to perform a predetermined job by using the image forming apparatus, and wherein the job authority information regulates the job authority that is allowed to the selected wireless device according to a device type of the selected wireless device obtained from the profile of the selected wireless device.

2. The method of claim 1, wherein the image forming apparatus operates as at least one of an access point (AP) that allows clients on a wireless local area network (WLAN) to be connected to each other and as a client on the WLAN, and the storing of the profile of the selected wireless device comprises receiving device information from the selected wireless device when the image forming apparatus operates as the AP, and generating and storing the profile of the selected wireless device by using the received device information.

3. The method of claim 1, wherein the setting of the extent of the job authority comprises requesting the selected wireless device to input a verification code, if the selected wireless device requests the image forming apparatus to execute a job, and setting the extent of the job authority of the selected wireless device by using the profile and the job authority information, on receiving the verification code which coincides with a verification code included in the stored job authority information.

4. The method of claim 1, further comprising storing a result of executing the job to be linked with the stored profile and the job authority information, when the execution of the requested job is finished.

5. The method of claim 1, further comprising deleting the job authority information corresponding to the profile of the selected wireless device, when the selected wireless device is not connected to the image forming apparatus again within a predetermined time period after the selected wireless device and the image forming apparatus are disconnected from each other.

6. A non-transitory computer readable recording medium having embodied thereon a computer program for executing the method according to claim 1.

7. The method of claim 1, wherein the image forming apparatus establishes a connection with the wireless device to receive information about the device.

8. The method of claim 7, wherein the profile of a selected wireless device is created from the received device information.

9. The method of claim 1, wherein the extent of the job authority allowed for the selected wireless device is set by using the device type obtained from at least one of the stored profile and the job authority information.

10. The method of claim 1, wherein the extent of the job authority allowed for the selected wireless device is set by using a device name obtained at least one of from the stored profile and the job authority information.

11. The method of claim 1, wherein the extent of the job authority allowed for the selected wireless device is set by using the model group in the same kind of device type obtained from at least one of the stored profile and the job authority information.

12. A method of controlling job authority of an image forming apparatus that supports a peer-to-peer (P2P) connection with a plurality of different types of wireless devices, the method comprising:
    searching for at least one of a plurality of different types of wireless devices capable of a P2P connection;
    selecting one of the wireless devices and establishing a connection with the selected wireless device to receive information about the selected wireless device;
    storing a profile of the selected wireless device that is P2P connected to the image forming apparatus in the image forming apparatus;
    receiving and storing a job authority information corresponding to the profile;

when the selected wireless device requests the image forming apparatus to execute an operation, setting a job authority of the selected wireless device by using the profile and the job authority information; and checking the job authority of the selected wireless device by the image forming apparatus, and executing the requested job when the selected wireless device has the authority to perform the requested job, wherein the job authority information is information that is necessary to set the job authority of the wireless device by using the profile of the wireless device, wherein the job authority denotes an authority for the wireless device to perform a predetermined job by using the image forming apparatus, and wherein the job authority information regulates the job authority that is allowed to the selected wireless device according to a device type of the selected wireless device obtained from the profile of the selected wireless device.

13. An image forming apparatus that supports a peer-to-peer (P2P) connection, the image forming apparatus comprising:

a user interface unit configured to display at least one of a plurality of searched different types of external wireless devices capable of a P2P connection with the image forming apparatus so that a user selects at least one of the searched different types of external wireless devices;

a communication interface unit including a hardware interface configured to connect to the selected external wireless device using a P2P connection method;

a profile storage unit including a hardware memory configured to store a profile of the selected wireless device that is connected to the communication interface unit;

a job authority information storage unit including a hardware memory configured to store job authority information corresponding to the profile stored in the profile storage unit;

a job execution unit including a hardware processor configured to execute a job requested by the selected wireless device; and a control unit including a hardware processor configured to set an extent of a job authority allowed for the selected wireless device by using the stored profile and the job authority information when the selected wireless device requests to execute the job, and allowing the job execution unit to execute the requested job if the selected wireless device has an authority to execute the requested job, wherein the job authority information is information that is necessary to set the extent of the job authority of the wireless device based on a device type of the wireless device or a model group in a same kind of the device type of the wireless device, and wherein the job authority denotes an authority for the wireless device to perform a predetermined job by using the image forming apparatus, wherein the job authority information regulates the job authority that is allowed to the selected wireless device according to a device type of the selected wireless device obtained from the profile of the selected wireless device, and wherein the user interface unit, communication interface unit, profile storage unit, job authority information storage unit, job execution unit and control unit are executed by a CPU and a memory.

14. The image forming apparatus of claim 13, wherein the image forming apparatus operates as at least one of an access point (AP) that allows clients on a wireless local area network (WLAN) to be connected to each other and as a client on the WLAN, and the profile storage unit stores the profile that is generated by using device information received from the selected wireless device when the image forming apparatus operates as the AP.

15. The image forming apparatus of claim 13, wherein the control unit requests the selected wireless device to input a verification code through a user interface unit when the selected wireless device requests the image forming apparatus to execute the job, and sets the extent of the job authority of the selected wireless device by using the profile and the job authority information when the verification code which coincides with a verification code included in the stored job authority information is input.

16. The image forming apparatus of claim 13, further comprising a job execution result storage unit, in which a result of executing the job is stored to be linked with the profile and the job authority information, when the execution of the job is finished, and wherein the job execution result storage unit is executed by the CPU and the memory.

17. The image forming apparatus of claim 13, wherein the control unit deletes the job authority information corresponding to the profile of the selected wireless device, when the selected wireless device is not connected to the image forming apparatus again within a predetermined time period after the selected wireless device and the image forming apparatus are disconnected from each other.

18. The image forming apparatus of claim 13, wherein the communications unit searches for a wireless device that is capable of P2P connection and establishing a connection with the wireless device to receive information about the wireless device.

19. The image forming apparatus of claim 18, wherein the profile of the wireless device is created from the received device information.

20. An image forming apparatus that supports a peer-to-peer (P2P) connection, the image forming apparatus comprising:

a user interface unit configured to display at least one of a plurality of searched different types of external wireless devices capable of a P2P connection with the image forming apparatus so that a user selects at least one of the searched different types of external wireless devices;

a communication interface unit including a hardware interface configured to connect to the selected external wireless device using a P2P connection method;

a profile storage unit including a hardware memory configured to store a profile of the selected wireless device that is connected to the communication interface unit;

a job authority information storage unit including a hardware memory configured to store job authority information corresponding to the profile stored in the profile storage unit;

a job execution unit including a hardware processor configured to execute a job requested by the selected wireless device; and a control unit including a hardware processor configured to set a job authority of the selected wireless device by using the profile and the job authority information when the selected wireless device requests to execute the job, and allowing the job execution unit to execute the requested job if the selected wireless device has an authority to execute the requested job, wherein the job authority information is information that is necessary to set the job authority of the wireless device by using the profile of the wireless device, wherein the job authority denotes an authority for the wireless device to perform a predetermined job by using the image forming apparatus, wherein the job authority information regulates the job authority that is allowed to the selected wireless device according to a device type of the selected wireless device grasped from the profile of the selected wireless device, and wherein the user interface unit, communication interface unit, profile storage unit, job authority information storage unit, job execution unit and control unit are executed by a CPU and a memory.

21. A method of controlling job authority of an image forming apparatus capable of supporting a peer-to-peer (P2P) connection with a selected one of a plurality of different types of wireless devices, the method comprising:

using a device discovery function to search for at least one of a plurality of different types of wireless devices that is capable of a P2P connection;

selecting, via a user interface, one of the discovered wireless devices and establishing a connection with the selected wireless device to receive information about the selected wireless device;

storing a profile of the selected wireless device that is P2P connected to the image forming apparatus in the image forming apparatus;

receiving and storing job authority information corresponding to the profile;

when the selected wireless device requests the image forming apparatus to execute an operation, setting an extent of a job authority allowed for the selected wireless device by using the stored profile and the job authority information; and checking the job authority of the selected wireless device by the image forming apparatus, and executing the requested job when the selected wireless device has the authority to perform the requested job based on the set extent of the job authority;

wherein the profile of the selected wireless device is created from the received device information, wherein the job authority information is information that is necessary to set the extent of the job authority of the wireless device based on a device type of the wireless device or a model group in a same kind of the device type of the wireless device, and wherein the job authority denotes an authority for the wireless device to perform a predetermined job by using the image forming apparatus, and wherein the job authority information regulates the job authority that is allowed to the selected wireless device according to a device type of the selected wireless device obtained from the profile of the selected wireless device.

* * * * *